US010112331B2

(12) United States Patent
Angst et al.

(10) Patent No.: US 10,112,331 B2
(45) Date of Patent: Oct. 30, 2018

(54) TOGGLE LEVER CLAMPING UNIT FOR AN INJECTION MOULDING MACHINE

(71) Applicant: Netstal-Maschinen AG, Näfels (CH)

(72) Inventors: Adrian Angst, Mollis (CH); Martin Fuchs, Ellikon an der Thur (CH); Manuel Hausammann, Wil (CH); Marcel Hautle, Mollis (CH); Daniel Jenny, Oberurnen (CH); Marc Lüthi, Galgenen (CH); Adrain Mächler, Feusisberg (CH); Marco Meier, Hinwil (CH); Markus Notz, Schwändi (CH); Remo Schwitter, Mollis (CH)

(73) Assignee: NETSTAL-MASCHINEN AG, Näfels (CH)

( * ) Notice: Subject to any disclaimer, the term of this patent is extended or adjusted under 35 U.S.C. 154(b) by 0 days.

(21) Appl. No.: 15/735,516

(22) PCT Filed: May 13, 2016

(86) PCT No.: PCT/EP2016/060854
§ 371 (c)(1),
(2) Date: Dec. 11, 2017

(87) PCT Pub. No.: WO2016/202509
PCT Pub. Date: Dec. 22, 2016

(65) Prior Publication Data
US 2018/0169919 A1    Jun. 21, 2018

(30) Foreign Application Priority Data

Jun. 19, 2015    (DE) .................. 10 2015 109 840

(51) Int. Cl.
*B29C 45/68*    (2006.01)
*B29C 45/17*    (2006.01)
(Continued)

(52) U.S. Cl.
CPC ........ *B29C 45/683* (2013.01); *B29C 45/1744* (2013.01); *B29C 45/5008* (2013.01);
(Continued)

(58) Field of Classification Search
CPC ... B29C 45/661; B29C 45/681; B29C 45/683; B29C 2045/1792
See application file for complete search history.

(56) References Cited

U.S. PATENT DOCUMENTS 8,123,989 B2 *   2/2012   Notz ................... B29C 45/5008
                                                     264/328.1
8,414,287 B2 *   4/2013   Wohlrab ................ B29C 45/68
                                                     425/592
(Continued)

FOREIGN PATENT DOCUMENTS

DE    102 42 290    4/2004
DE    103 42 012    4/2004
(Continued)

OTHER PUBLICATIONS

International Search Report dated Jun. 27, 2016 by the European Patent Office in International Application PCT/EP2016/060854.

*Primary Examiner* — James P Mackey
(74) *Attorney, Agent, or Firm* — Henry M. Feiereisen LLC

(57) ABSTRACT

A toggle lever clamping unit for an injection molding machine includes fixed and movable platens, a support plate, a toggle lever mechanism operatively connected with both the support plate and the movable platen, a cross clamp operatively connected with the toggle lever mechanism and movable along a machine longitudinal axis, and an electric drive for moving the cross clamp. In addition, a hydraulic drive is operatively connected with the cross clamp and includes a fluid-operated piston cylinder system, with the lengths of the cylinder and the piston rod being coordinated (Continued)

with one another such that the hydraulic drive follows a travel path of the cross clamp as the movable platen travels between an open position of the clamping unit, in which the toggle lever mechanism is swung in, and a closed position in which the toggle lever mechanism assumes a predeterminable extended position and a clamping force is built up.

15 Claims, 4 Drawing Sheets

(51) Int. Cl.
  *B29C 45/50* (2006.01)
  *B29C 45/76* (2006.01)
  *B29C 45/64* (2006.01)
  *B29C 45/82* (2006.01)
  *B29C 45/66* (2006.01)

(52) U.S. Cl.
  CPC .......... *B29C 45/681* (2013.01); *B29C 45/661* (2013.01); *B29C 2045/1792* (2013.01); *B29C 2045/648* (2013.01); *B29C 2045/7673* (2013.01); *B29C 2045/824* (2013.01); *B29C 2945/76692* (2013.01)

(56) References Cited

U.S. PATENT DOCUMENTS

| | | | | |
|---|---|---|---|---|
| 9,156,199 B2* | 10/2015 | Notz | ................... | B29C 45/5008 |
| 9,229,439 B2* | 1/2016 | Notz | ................... | B22D 17/2015 |
| 2003/0147989 A1* | 8/2003 | Kasai | ................... | B29C 45/1761 |
| | | | | 425/593 |
| 2009/0291162 A1* | 11/2009 | Wenzin | ................... | B29C 45/03 |
| | | | | 425/567 |
| 2011/0038976 A1* | 2/2011 | Stirn | ................... | B29C 33/442 |
| | | | | 425/161 |
| 2012/0107448 A1 | 5/2012 | Wohlrab | | |

FOREIGN PATENT DOCUMENTS

| | | |
|---|---|---|
| DE | 102008007793 | 8/2009 |
| EP | 2 281 675 | 2/2011 |
| EP | 2 456 607 | 4/2013 |
| JP | H 10-258451 | 9/1998 |
| JP | 2009-255463 | 11/2009 |
| JP | 2010-234584 | 10/2010 |
| WO | WO 2011/003694 | 1/2011 |

* cited by examiner

TOGGLE LEVER CLAMPING UNIT FOR AN INJECTION MOULDING MACHINE

CROSS-REFERENCES TO RELATED APPLICATIONS

This application is the U.S. National Stage of International Application No. PCT/EP2016/060854, filed May 13, 2016, which designated the United States and has been published as International Publication No. WO 2016/202509 and which claims the priority of German Patent Application, Serial No. 10 2015 109 840.7, filed Jun. 19, 2015, pursuant to 35 U.S.C. 119(a)-(d).

BACKGROUND OF THE INVENTION

The present invention relates to a toggle lever clamping unit for an injection moulding machine.

A toggle lever clamping unit generally comprises a fixed platen, a movable platen and a support plate. Between the support plate and the movable platen, a toggle lever mechanism is arranged, which can be actuated by means of a drive device. The toggle lever mechanism consists of a plurality of levers connected articulatedly to one another, which are connected by articulations to the support plate and to the movable platen. In order to be able to actuate the toggle lever mechanism between a swung-in position of the levers and a swung-out position of the levers—also designated extended or dead centre position of the toggle lever mechanism—, the drive device is operatively connected to a cross clamp or to a plate, which fulfils a similar function, which in turn is articulatedly operatively connected to one or more levers of the toggle lever mechanism. The drive device serves for the opening and closing of the toggle lever clamping unit and is also to be configured for the application of the clamping force. The two operating phases of opening and closing on the one hand, and of the application of the clamping force on the other hand, differ here considerably in their requirement profile. On opening and closing, the movable platen is to be moved as quickly as possible, wherein only the mass moments of inertia and frictions have to be overcome. This travel movement often also takes place over a longer path. On application of the clamping force, the actuation elements realize a path, but this acts as a force on the plates which are touching each other. The path covered on application of the clamping force is necessary, in order to compensate for the elastic expansion of the components under clamping force. Enormous clamping forces are to be applied, in order to be able to press the halves of an injection moulding tool with the required force and to keep them shut. For application of the clamping forces, the stroke of the toggle lever, or a separate drive, installed independently of the cross clamp, can be used.

Various types of toggle lever clamping units are known from the prior art, in which at least a substantial portion of the opening and closing actuation is brought about by means of an electric motor. Here, the electric motor serves in particular to open and to close the clamping unit, which it can bring about in an energy-efficient and rapid manner. The electric motor can also serve to apply at least a portion, possibly a majority, of the clamping force. In addition to the electric motor, however, separate hydraulic drives can also be provided. Simple and commercially available piston cylinder systems can be used for the hydraulic drive. These piston cylinder systems can also be configured so as to be double-acting, so that they can be used on the one hand for applying the clamping force, but on the other hand can also be used in a supporting manner for pulling open the clamping unit at the start of the opening process. The hydraulic cylinder of such a piston cylinder system can be connected to a hydraulic supply via a simple valve. This valve can be a simple shift valve, which can optionally act upon the double-acting piston in both direction, or can set it 'to idle'. With such an idle position, the piston would be able to be pushed freely to and fro.

A toggle lever clamping unit of the above-mentioned type is known from JP2010234584A, wherein an electric motor is provided for moving the cross clamp, and the additional hydraulic drive is formed by piston cylinder systems which are arranged between the movable platen and the fixed platen. The hydraulic cylinder of the piston cylinder system is fastened here to the fixed platen, and the piston rod of the piston cylinder system is fastened to the movable platen.

A further toggle lever clamping unit of the above-mentioned type is described schematically in WO2011003694A1, wherein an electric motor is provided for moving the cross clamp and wherein in different embodiments the main levers can be brought by means of hydraulic additional drives into the extended or respectively dead centre position. These additional drives are arranged between the cross clamp on the one hand and the main levers, on the other hand, arranged symmetrically on both sides of the central axis and acting between the support plate and the movable platen. In a first embodiment, hydraulic cylinders are provided in or on the cross clamp. The associated piston rods are operatively connected respectively to a connecting lever mounted on a main lever. In a further embodiment, the connecting levers are formed between the cross clamp and the main lever itself as a piston cylinder system. Here, for example, the cylinder can be mounted articulatedly on one of the main levers and the piston rod can be operatively connected articulatedly with the cross clamp.

EP2456607B1 discloses diagrammatically a further toggle lever clamping unit with an electric motor for moving the cross clamp and with hydraulic additional drives, in order to be able to bring the main levers into the extended or respectively dead centre position. In some embodiments, the hydraulic additional drive is arranged between the support plate and the main levers which are connected to the support plate. In other embodiments, the hydraulic additional drive is arranged between the movable platen and the main levers, which are connected to the movable platen. When the hydraulic additional drive is connected to the main levers, with a horizontal position of the drive the operating direction is unfavourable for the power direction. The transferable energy is small; at the same time, the design of the structure must be correspondingly stable. When the hydraulic additional drive lies vertically, the geometric arrangement is critical, because the installation space is limited. A further embodiment provides the arrangement of hydraulic additional drives between two main levers, lying opposite one another and mounted on the movable platen. It remains unconsidered, that the main levers swing in strongly in the direction of the central axis on their movement into the open position of the clamping unit, so that a practical implementation may be difficult.

From JPH10258451A a toggle lever clamping unit is known, in which an additional movable auxiliary plate is provided between the movable platen and the support plate. In this auxiliary plate, a hydraulic cylinder is integrated, the piston of which is connected to a piston rod, which is directed out from the auxiliary plate and is operatively connected to the movable platen. The electrically driven toggle lever mechanism is operatively connected by drive technology to the support plate and to the auxiliary plate.

SUMMARY OF THE INVENTION

Proceeding from the above-mentioned prior art, the invention is based on the problem of indicating a further toggle lever clamping unit with an electrically driven cross clamp and with an additional hydraulic drive, which is distinguished by a structurally simplified overall concept, and which in particular is suitable for fast cycling injection moulding machines with short cycle times.

The solution to this problem takes place through a toggle lever clamping unit having a fixed platen, a movable platen, a support plate, a toggle lever mechanism arranged between the support plate and the movable platen and in operative connection with the support plate on the one hand and with the movable platen (6) on the other hand, a cross clamp in operative connection with the toggle lever mechanism and movable along the machine longitudinal axis, and with one or more electric drive(s) for moving the cross clamp, wherein additionally to the electric drive(s) at least one hydraulic drive is provided, which is in operative connection with the cross clamp and by which a moving of the cross clamp along the machine longitudinal axis is able to be produced, wherein the hydraulic drive has a piston cylinder system able to be acted upon by a pressure fluid, wherein the length of the cylinder and the length of the piston rod are coordinated with one another and designed such that the hydraulic drive can also make the movement path of the cross clamp on moving of the movable platen between an open position of the clamping unit, in which the toggle lever mechanism is swung in, and a closed position in which the toggle lever mechanism (4) is in a predeterminable extended position and clamping force is built up.

Advantageous configurations and further developments are to be found in the subclaims.

Through the fact that in addition to the electric drive, a hydraulic drive is provided, which is in operative connection with the cross clamp and has a piston cylinder system which is able to be acted upon by a pressure fluid, the advantages of the above-mentioned types of toggle lever clamping units can be maintained, namely on the one hand to provide the electric drive predominantly for the travel movement, and in this respect to design it in an optimized manner, and depending on the manner of operation, to provide the use of recuperation, and on the other hand the hydraulic additional drive predominantly for the generation of the clamping force and to design it in an optimized manner in this respect. The cylinder of the piston cylinder system can be stationary and the piston rod of the piston cylinder system can be in operative connection with the cross clamp by means of drive technology. However, it can also be the case that the piston rod of the piston cylinder system is stationary and the cylinder of the piston cylinder system is in operative connection with the cross clamp by means of drive technology.

Any structural element which can be moved to and fro or respectively forwards and backwards along the longitudinal axis of the machine and can be mounted on the lever of a toggle lever mechanism is to be understood as a cross clamp in the sense of the present invention. The cross clamp can therefore have the shape of a cross for example in top view in the viewing direction of the longitudinal axis of the machine. However, the cross clamp can also be configured as a plate. Further configurations are also conceivable. The concern is only that the cross clamp is configured as a bearing site, wherein on the one hand one or more drives are arranged or respectively mounted on the cross clamp for moving the cross clamp along the longitudinal axis of the machine, and wherein on the other hand a toggle lever mechanism is arranged or respectively mounted in an articulated manner on the cross clamp. The cross clamp is always guided, for example by slideways or columns.

As in addition provision is made according to the invention that the length of the cylinder and the length of the piston rod are coordinated to one another and designed such that the hydraulic drive can also make the movement path of the cross clamp on moving of the movable platen between an open position of the clamping unit, in which the toggle lever mechanism is swung in, and a closed position, in which the toggle lever mechanism is in a predeterminable extended position, and clamping force is built up, it is in addition not necessary to mechanically connect the hydraulic drive additionally at a suitable moment in time, as is the case in the above-mentioned prior art. Whereas the mechanical additional connection of the hydraulic drive or a mechanical switching over to the hydraulic drive requires a certain expenditure of time and therefore costs cycle time, with the toggle lever clamping unit according to the invention it is achieved that the cycle time is shortened compared to the above-mentioned prior art, which is advantageous in particular for the operation of fast cycling injection moulding machines.

Consequently, a central idea of the present invention is to provide on the cross clamp both an electric drive and also a hydraulic drive, and to design the piston cylinder system of the hydraulic drive so that the piston cylinder system not only makes a short stroke for the build-up of clamping force, but that this piston cylinder system is designed so that it can also carry out the entire stroke on moving of the cross clamp and therefore on moving of the movable platen. Therefore, no unnecessary time is lost, in order to switch over mechanically, depending on mode of operation, from one drive to the other drive, or to additionally connect the other drive mechanically to the one drive, but rather the manner of activation of the drives is adapted without loss of time. Savings are also made with regard to provisions of control technology, in order to be able to carry out this mechanical switching over in the shortest possible time and as 'smoothly' as possible.

A further advantage of the invention lies in that the electric drive if necessary as already indicated above is supported by the hydraulic drive on moving of the movable platen. Thereby, the travel movement can be made even quicker. If applicable, the electric drive can be designed to a smaller output.

Depending on the case of application, it can be advantageous to make the travel movement purely electrically, and in this time to switch the hydraulic cylinders to idling, and to only act upon the hydraulic cylinder with pressure for the generating of the clamping force. Cases of application also exist, however, precisely those in which short opening strokes are travelled, in which movement is carried out with the hydraulic drive and in which the electric drive is switched on for assistance during the build-up of clamping pressure.

Drive designs which are known per se can be used for the electric drive. For example, a toothed rack in operative connection with the cross clamp can be provided for the electric drive, and a pinion gear, driven by an electric motor, the output pinion of which is in engagement with the toothed rack. Likewise, it is possible to use a nut-spindle combination for the electric drive, wherein preferably the nut is drivable by an electric motor and the spindle is operatively connected to the cross clamp. However, it is also conceivable that the spindle is driven by the electric motor and the nut is operatively connected to the cross clamp.

For the hydraulic drive, a hydraulic accumulator, connected to a pressure medium source, and/or a hydraulic pump can be used. Consequently, a hydraulic accumulator or a pump can be provided, in order to convey a pressure fluid from a pressure fluid storage container, in particular from a tank, to the cylinder of the piston cylinder system, and to act with the necessary pressure upon the pressure chamber for the clamping pressure. Alternatively thereto or additionally thereto, an accumulator can also be provided, the pressure line of which is connected to the pressure medium chamber for the clamping pressure.

Preferably, a hydraulic drive system is suitable which is already present in any case in the injection moulding machine, with an accumulator, in which a pressure fluid is stored with a particular pressure. Such accumulator systems are in use in particular in so-called fast cycling injection moulding machines, in which a high injection speed must be achieved. These injection speeds must then be achieved in particular when the mould is closed. On closing of the mould itself, an operation of the injection means during the majority of the stroke is not necessary, so that the accumulator system, which is present in any case for the injection means, can also be used for the hydraulic drive or the hydraulic drives for moving the cross clamp.

A single-acting cylinder, a double-acting cylinder, a synchronizing cylinder or, particularly in the case of large forces which are to be applied, a tandem cylinder, can be selected as piston cylinder system.

A preferred field of application are 5-point toggle lever clamping units. Basically, the drive concept according to the invention can also be used in other toggle lever clamping units.

BRIEF DESCRIPTION OF THE DRAWING

The invention is to be explained further by means of example embodiments and with reference to the figures. There are shown.

DETAILED DESCRIPTION OF THE PREFERRED EMBODIMENTS

Figure 1:
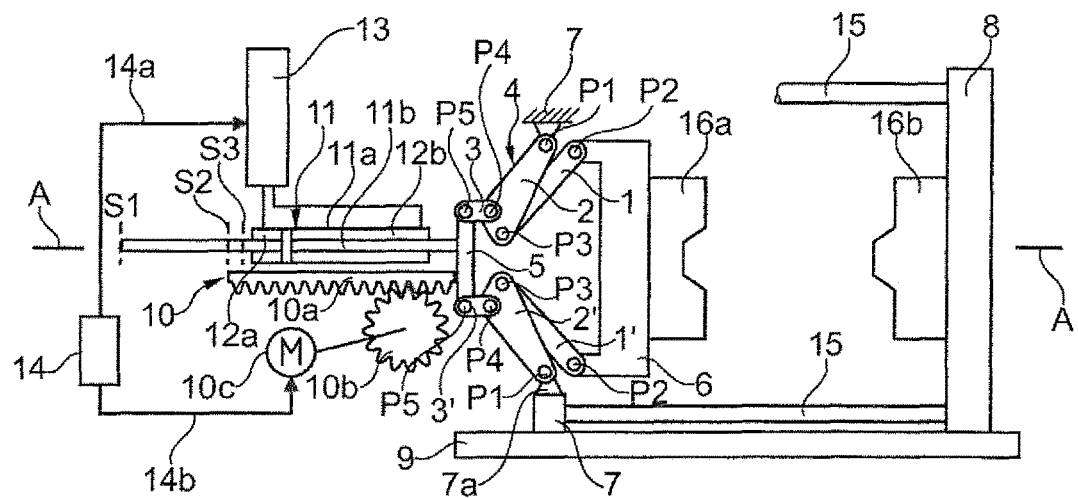
FIG. 1 first embodiment of a toggle lever clamping unit according to the invention, with an electrically driven toothed rack combination and with a synchronizing cylinder,—in opened state.
Figure 2:
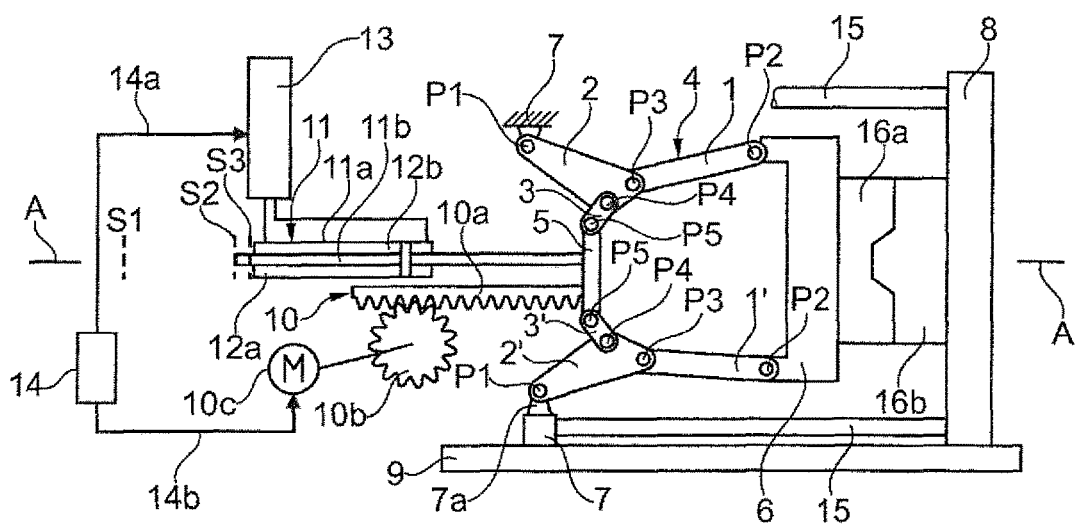
FIG. 2 first embodiment of a toggle lever clamping unit according to the invention with an electrically driven toothed rack combination and with a synchronizing cylinder,—in closed state, but without clamping force.
Figure 3:
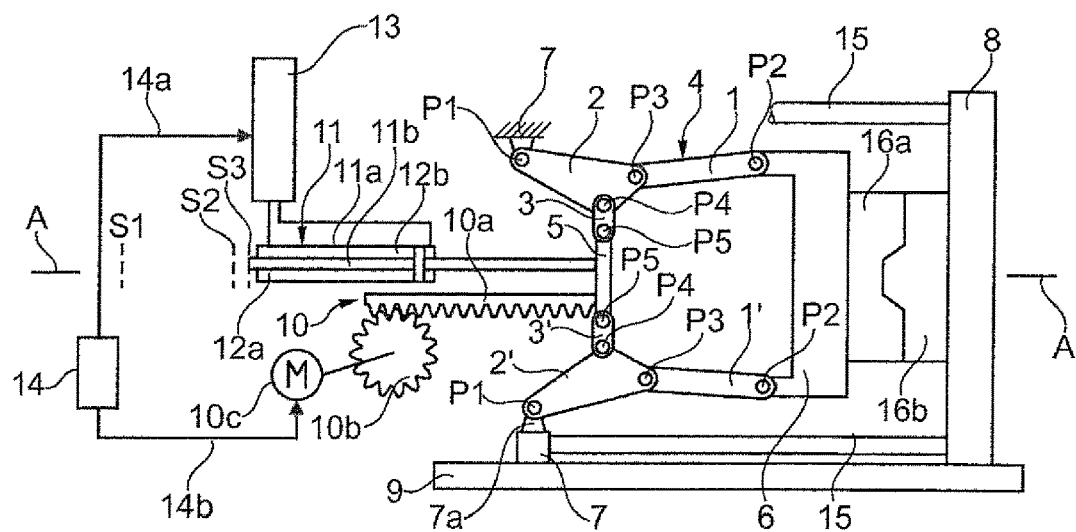
FIG. 3 first embodiment of a toggle lever clamping unit according to the invention with an electrically driven toothed rack combination and with a synchronizing cylinder,—in closed state and with built-up clamping force.

A first embodiment of the invention is to be described below with reference to FIGS. 1, 2 and 3. The toggle lever clamping unit illustrated in FIGS. 1, 2 and 3 is configured as a 5-point toggle lever clamping unit and comprises a machine bed 9, on which a fixed platen 8, a movable platen 6 and a support plate 7 are arranged. Mould halves 16a and 16b of an injection moulding tool are fastened on the two platens 6 and 8. To receive the clamping force, the support plate 7 and the fixed platen 8 are connected to one another by columns 15. The movable platen 6 is mounted displaceably on the columns 15 or on the machine bed 9. This is known per se and therefore does not need to be illustrated and described in further detail. Between the movable platen 6 and the support plate 7, two lever assemblies, including pairs of main levers 1, 2 and 1', 2', respectively, are provided above and below the central longitudinal axis A of the machine. Each pair has a main lever 2, 2', which is articulatedly mounted on a lug 7a of the support plate 7 at a first point $P_1$, and main lever 1, 1' which is articulately mouned with the movable platen 6 at a second point $P_2$. The main levers are articulatedly connected to one another respectively at a third point $P_3$. Between each one main lever of a pair and the cross clamp 5 a connecting lever 3, 3' is provided, which is connected by its one end articulately at a fourth point $P_4$ to the main lever 2, 2', articulated to the support plate, and is articulatedly connected at a fifth point $P_5$ to the cross clamp 5, wherein the third articulation point $P_3$ and the fourth articulation point $P_4$ are spaced apart from one another. At the cross clamp 5 both an electric drive 10 and also a hydraulic drive 11 are provided and are in operative connection with the cross clamp 5 by means of drive technology. in the present example embodiment, the electric drive 10 is configured as a toothed rack gear, wherein the toothed rack 10a is operatively connected to the cross clamp and the output pinion 10b is driven by an electric motor 10c via a single- or multiple-stage mechanical gear. The piston cylinder system 11 is configured in such a way that the cylinder 11a is stationary and, for example, is fastened to the support plate 7, and the piston rod 11b is operatively connected to the cross clamp 5. The piston cylinder system 11 is a double-acting synchronizing cylinder. The effective surfaces on both sides of the piston are respectively annular surfaces and of equal size. The synchronizing cylinder has two pressure medium chambers 12a and 12b. The pressure medium chamber 12a forms the pressure chamber for the generation of the clamping pressure and is coupled to the hydraulic supply. The pressure medium chamber 12a can be acted upon with pressure fluid by a pump, an accumulator, or by both. The length of the cylinder 11a and the length of the piston rod 11b are coordinated to one another and designed so that the piston rod 11b can also make the entire movement path $S_v$ of the cross clamp 5 on moving of the movable platen 6. This is intended to be illustrated by the vertical lines $S_1$, $S_2$ and $S_3$ arranged in FIGS. 1 to 3. The line $S_1$ is aligned with the rear end position of the cross clamp 5 (open position of the clamping unit according to FIG. 1) and the line $S_2$ is aligned with a first front position of the cross clamp 5, which lies shortly before the dead centre position of the toggle lever mechanism and generally corresponds to the position in which the mould halves 16a and 16b lie against one another and the parting plane is closed (FIG. 2). The line $S_3$ corresponds to the second front position of the cross clamp 5, which corresponds to the position in which the toggle lever mechanism is situated in its extended position (FIG. 3). The extended position is normally not identical to the dead centre position. In the dead centre position, the levers 1, 2 (or respectively 1', 2') and articulations P1, P2 and P3 would lie on a line and the angle between the levers would be 0°. At the extended position, the transmission ratio of the machine i=ds piston/ds movable platen is not at infinity, as it would be in the dead centre position, but rather at a substantially smaller i, depending on the design of the machine. This line $S_3$ therefore corresponds to the front end position of the cross clamp 5. It lies shortly before the dead centre position. The angle between the levers in the extended position is then a few degrees. Typical values lie between 1° and 4°, preferably between 2° and 3°. Basically, however, it would also be conceivable to move the toggle lever mechanism into the dead centre position. The dead centre position and the extended position would then be congruent. In the case where an actuator acts directly on this toggle lever, situated in the dead centre position, this must engage almost perpendicularly on a lever in order to move the toggle lever mechanism out from the dead centre again.

Figure 4:
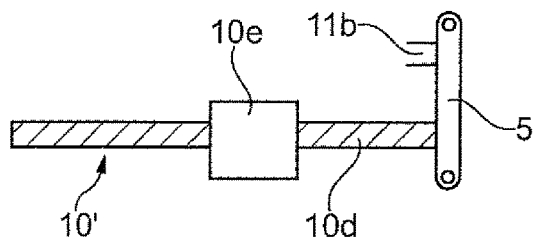
FIG. 4 a nut-spindle combination as alternative electric drive.

FIG. 4 shows an alternative electric drive. Instead of the toothed rack drive of FIGS. 1, 2 and 3, a nut-spindle system, driven by an electric motor, is now provided. The spindle 10*d* is connected by means of drive technology to the cross clamp 5, the spindle nut 10*e* is driven by the electric motor.

Figure 5:
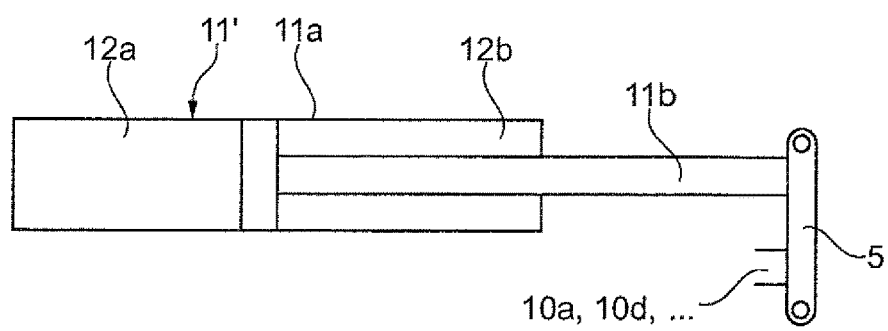
FIG. 5 an alternative hydraulic piston cylinder system, namely a double-acting cylinder.

FIG. 5 shows an alternative piston cylinder system 11'. It differs from the piston cylinder system 11 in so far as in the example embodiment which is shown here, the piston rod is not configured continuously, i.e. it is not a synchronizing cylinder, but rather a double-acting cylinder.

The mode of operation of the toggle lever clamping unit according to the invention is as follows. Starting from the opened position according to FIG. 1, firstly only the electric motor 10*c* is operated and the pinion 10*b* is rotatably driven in such a direction that the toothed rack 10*a* is moved in the longitudinal direction of the machine towards the movable platen 6, and thereby the cross clamp 5 is likewise moved in this direction. Thereby, the two pairs of main levers are swung open outwards by means of the two connecting levers 3, 3' and reach, towards the end of the travel movement, the position shown in FIG. 2, in which the mould halves 16*a* and 16*b* are closed (mould closed position).

The piston cylinder system 11 also runs, during the above-mentioned travel movement, without drive function (idling), i.e. the piston rod 11*b* is simply entrained by the cross clamp 5. The movable mould plate is firstly accelerated, then moves with a particular speed profile and is braked before contact of the two mould halves 16*a*, 16*b*, so that no damage occurs to the tool or to the clamping unit. During the braking process, the electric drive can be switched into recuperation.

Towards the end of the travel movement, at a predeterminable point in time or a predeterminable position of the clamping unit, the piston cylinder system 11 is connected so as to be active. Preferably, the piston cylinder system 11 is then connected so as to be active when the clamping unit is shortly before the closed state illustrated in FIG. 2 or when the mould plates already have contact. The piston rod 11*b* has reached the position S2. The active connecting means that the pressure medium chamber 12*a* is acted upon by a pressure fluid from the hydraulic supply 13 (see FIG. 6), until the desired clamping pressure has been reached in the pressure medium chamber 12*a*. During the active switching of the piston cylinder system 11, the electric motor 10*c* can continue to be operated, switched to idling or in recuperation. This idling or recuperation situation permits three states of the electric drive:

1) The electric drive is driven, through the axis movement, operated by the hydraulic drive. The hydraulic drive drives, through its delivered output, not only the movable platen, but entrains the electric drive. No electrical energy is delivered to or discharged from the electric drive.
2) The electric drive is driven actively by the electric motor, so that, however, no energy is transferred to the cross clamp. The travel movement is carried out purely by the hydraulic drive. The hydraulic drive does not entrain the electric drive, but rather the electric motor applies this portion of the driving power.
3) Recuperation. The electric drive converts mechanical energy from the hydraulic drive into electrical energy, wherein Case 3) always only occurs in cooperation with Case 1) or 2).

The two pairs of main levers are swung further open by means of the two connecting levers 3, 3', until the state illustrated in FIG. 3 is reached. This brings about the build-up of clamping force with a small movement of the piston or respectively of the electric drive. The toggle lever mechanism is now in the extended position described above, therefore shortly before the dead centre position.

After the end of the injection- and holding pressure phase, the clamping unit can be released and then opened. On the release, the electric drive can take up the described operating states. For releasing of the clamping unit, if applicable the pressure medium chamber 12*b* can be acted upon with a pressure fluid and the pressure medium chamber 12*a* can be switched to discharge. This assumes a corresponding valve control of the hydraulic supply 13. After a predeterminable opening stroke, the piston cylinder system 11 can be switched to idling again and the further movement path up to final open position according to FIG. 2 can take place exclusively electrically. The activation of the electric drive and of the hydraulic drive can be carried out by the central control 14 of the injection moulding machine. This is to be indicated diagrammatically by the signal lines 14*a* and 14*b* originating from the control 14.

Six cases are differentiated as to how the system can be operated from electric and hydraulic drive:

1) The travel movement takes place purely through the electric drive; the hydraulic drive is idling.
2) The travel movement takes place purely through the hydraulic drive; the electric drive is idling.
3) The travel movement takes place electrically and hydraulically in a combined manner. This can be the case when the clamping unit is to be moved open and shut as quickly as possible.
4) The build-up of clamping force is carried out purely electrically. The hydraulic drive is idling, but it is not required if the forces for the build-up of clamping force are small.
5) The build-up of clamping force runs purely hydraulically; the electric drive is idling.
6) The build-up of clamping force is ensured by the combination of electric and hydraulic drive.

These above-mentioned six cases can now be pre-fabricated as desired by the machine manufacturer, for example for an operation in which as little energy as possible is consumed, or an operation in which the movement times are as little as possible, or the machine manufacturer leaves the choice of the combination of drives open, to be arranged by the user freely and independently of one another. For example, the closing can take place by the electric drive, the hydraulic drive is idling, and both drives act for the build-up of clamping force. Depending on the case of application, the hydraulic drive can be switched so as to be active only on closing or only on opening or on both travel movements. The operation of the electric axis in recuperation can be connected in the above-mentioned cases 2), 3), 5) and 6), in order to recover energy. A recuperation is always not possible when driving takes place through the electric drive or when the latter is entirely inactive. Also, it is to be possible to change between the operating types during travel or during the build-up of clamping force. It is therefore possible to switch a drive so as to be active not only before initiation of a process step of mould closure, but also when this is already initiated.

Figure 6:
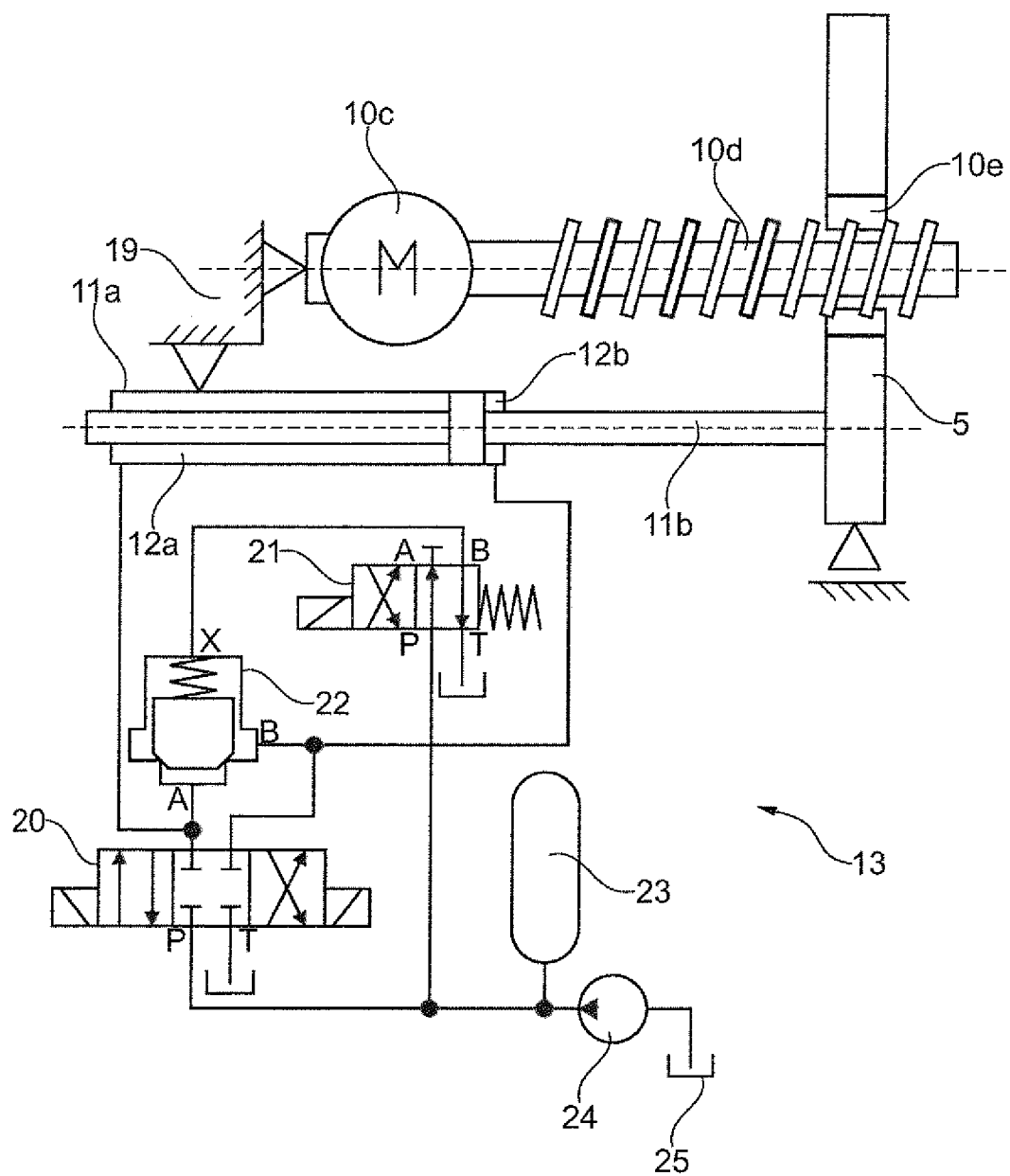
FIG. 6 an embodiment for the hydraulic supply.

FIG. 6 shows an embodiment for a hydraulic supply 13 of the piston cylinder system 11. This hydraulic system comprises three valves 20, 21 and 22, an accumulator 23 and a pump 24. The pump 24 is connected to a pressure medium source 25 and can fill the accumulator 23 with pressure medium and place it under a desired pressure. The pressure medium can also be conducted directly to the valves by the pump 24. Depending on the switching position of the valves, the pressure medium chambers 12a and 12b are switched to inflow or to discharge. When the piston rod 11b is only entrained by the cross clamp 5, the valves can be switched so that only a circulation of pressure medium between the pressure medium chambers 12a and 12b takes place. The electric drive is embodied as a nut-spindle combination, wherein, however, in contrast to the illustration in FIG. 4, the spindle 10d is now driven rotatably by the motor 10c and the spindle nut 10e is mounted in a torque-proof manner in the cross clamp 5. The reference number 19 designates a bearing or respectively a bearing site for the drives.

According to an embodiment, the piston cylinder system 11 is supplied by the accumulator 23. The accumulator 23, in turn, is supplied by the pump 24. The hydraulic supply is designed for the briefly required amount of energy. The pump output is determined by the necessary average output. On power input of the hydraulic consumer 11, the oil is drawn from the accumulator 23, possibly excess pressure energy is converted into heat or can be recovered through the electric axis.

On idling of the hydraulic axis, the necessary oil quantities can both be drawn via the accumulator 23 and the excess can be delivered to the tank T, or else by the oil being circulated between the two pressure medium chambers 12a and 12b and the lack of oil or respectively excess of oil resulting according to the cylinder embodiment is either drawn via the accumulator system 23 or delivered to the tank T, or can be drawn via a further oil reservoir (not illustrated here), near to the consumer, or delivered thereto.

In a further embodiment of the hydraulic supply, the piston cylinder system 11 is operated only by the pump 24. On power consumption of the hydraulic consumer, the oil is conveyed via the pump 24 into one of the pressure medium chambers 12a or 12b. The design of the pump 24 provides the peak performance and dynamics at the consumer, i.e. at the piston cylinder system 11. With the components pump, its motor and if applicable a frequency converter, both costs and also the performance capability and energy efficiency are influenced. When the hydraulic drive is idling, a pressure medium chamber is supplied with oil by the pump 24, the other pressure medium chamber is emptied towards the tank T. Alternatively, the oil can be circulated between the two cylinder chambers, and the lack of oil or respectively excess of oil resulting depending on the cylinder embodiment are drawn via the pump and delivered to the tank. It would also be possible that the oil quantities resulting on circulation are drawn via a further oil reservoir, close to the user, or are delivered thereto. The pressure medium source 25 and the tank T, indicated at the valves 20 and 21, usually form a structural unit, i.e. there is only one single tank, from which pressure medium can be removed and into which pressure medium can be delivered.

The exclusive operation of the piston cylinder system by the pump is of less interest from the point of view of energy. On the other hand, the following types of operation are rated as being preferred:
1) Supply only via the accumulator
2) Supply via the accumulator on a travel movement and in idling with the pump
3) A supply configured dependent on output: With a high output density, the accumulator is utilized. If applicable, the pump can be additionally switched on in a supporting manner. With low output density, the operation with the pump is sufficient
   With the combined supply types, it becomes possible to define an output-optimized or an energy-optimized mode of the machine, which can be accessed by the machine operator.

Figure 7:
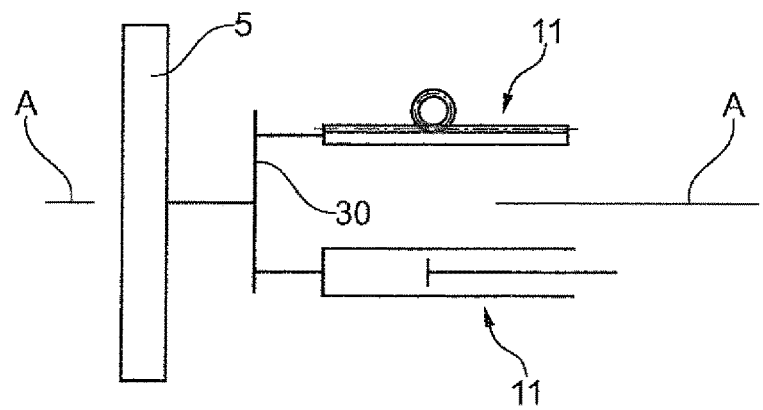
FIG. 7-9 various embodiments of the arrangement of electric and hydraulic drive on the cross clamp.
Figure 8:
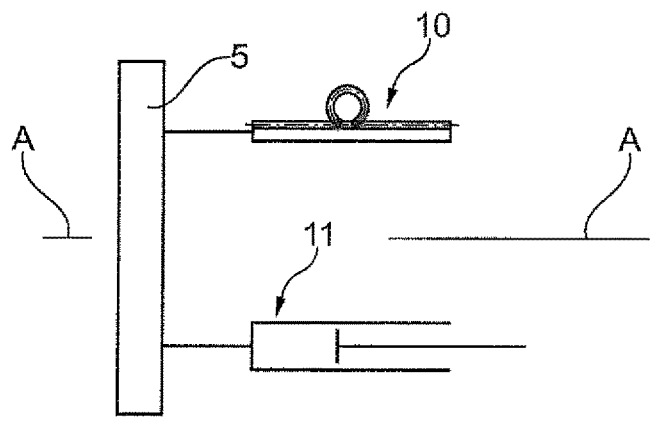
Figure 9:
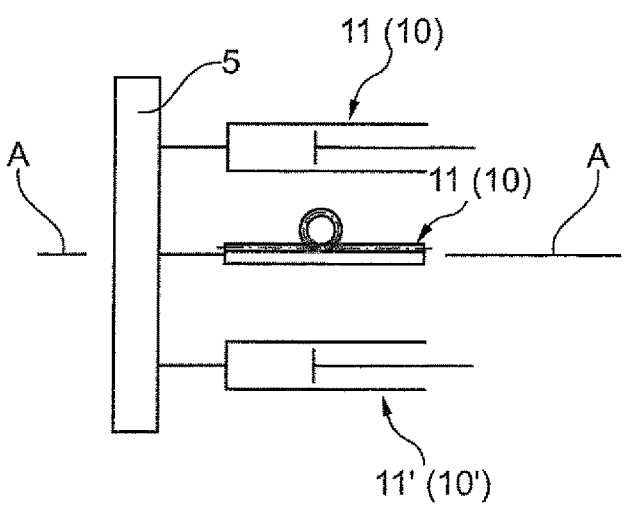

Alternatively to the embodiment illustrated in FIG. 1 to 3, a plurality of hydraulic drives and/or a plurality of electric drives can also come into use. Their arrangement can take place in various ways. In FIGS. 7 to 9, by way of example various arrangements are shown. Further arrangements are easily able to be realized for the specialist in the art and are included by the present invention:

FIG. 7: The electric drive 10 and the hydraulic drive 11 lie in a parallel manner, but for both power for generating the travel movement is directed centrically onto the cross clamp 5. For example, this is possible through an intermediate plate 30, onto which the drives engage. The intermediate plate 30 is coupled with the cross clamp 5 so that the coupling engages centrally on the cross clamp 5.

FIG. 8: Both the electric drive 10 and also the hydraulic drive 11 engage symmetrically eccentrically on the cross clamp 5.

FIG. 9: A drive type engages centrically on the cross clamp 5, the other drive type engages symmetrically eccentrically. For example, an electric drive 10 could engage centrically on the cross clamp 5 and two hydraulic drives 11, 11' could engage symmetrically eccentrically on the cross clamp 5. Vice versa, a hydraulic drive 11 could engage centrically on the cross clamp 5 and two electric drives 10, 10' could engage symmetrically eccentrically on the cross clamp 5. This case is to be illustrated by the reference numbers placed in brackets in FIG. 9.

The views in FIGS. 7 to 9 can be regarded as a top view or as a side view.

| List of Reference Numbers | |
|---|---|
| 1, 1' | Main lever on movable platen |
| 2, 2' | Main lever on support plate |
| 3, 3' | Connecting lever |
| 4 | Toggle lever mechanism |
| 5 | Cross clamp |
| 6 | Movable platen |
| 7 | Support plate |
| 7a | Lug |
| 8 | Fixed platen |
| 9 | Machine bed |
| 10 | Electric drive with rod |
| 10' | Electric drive with spindle |
| 10a | Toothed rack |
| 10b | Output pinion of a gear |
| 10c | Electric motor |
| 10d | Spindle |
| 10e | Spindle nut |

List of Reference Numbers

| | |
|---|---|
| 11 | Piston cylinder system with continuous piston rod = synchronizing cylinder system |
| 11a | Cylinder |
| 11b | Piston rod |
| 11' | Piston cylinder system without continuous piston rod = double-acting cylinder |
| 12a | Pressure medium chamber |
| 12b | Pressure medium chamber |
| 13 | Hydraulic supply |
| 14 | Control |
| 14a | Signal line to the hydraulic drive |
| 14b | Signal line to the electric drive |
| 15 | Columns |
| 16a | Movable mould half |
| 16b | Fixed mould half |
| 19 | Bearing |
| 20 | First valve |
| 21 | Second valve |
| 22 | Third valve |
| 23 | Accumulator |
| 24 | Pump |
| 25 | Pressure medium source or respectively tank |
| 30 | Intermediate plate |
| P1-P5 | Articulation points |

What is claimed is:

1. A toggle lever clamping unit for an injection moulding machine, said toggle lever clamping unit comprising:
    a fixed platen;
    a movable platen movable in relation to the fixed platen;
    a support plate;
    a toggle lever mechanism arranged between the support plate and the movable platen and operatively connected with both the support plate and the movable platen;
    a cross clamp operatively connected with the toggle lever mechanism and movable along a machine longitudinal axis;
    an electric drive operatively connected with the cross clamp for moving the cross clamp; and
    a hydraulic drive operatively connected with the cross clamp, said hydraulic drive including a piston cylinder system which is operated by a pressure fluid and comprises a cylinder defined by a length and a piston rod defined by a length, with the lengths of the cylinder and the piston rod being coordinated with one another such that the hydraulic drive follows a travel path of the cross clamp as the movable platen travels between an open position of the clamping unit, in which the toggle lever mechanism is swung in, and a closed position in which the toggle lever mechanism assumes a predeterminable extended position and a clamping force is built up.

2. The toggle lever clamping unit of claim 1, wherein the cylinder of the piston cylinder system is stationary and the piston rod of the piston cylinder system is placed in driving relation to the cross clamp.

3. The toggle lever clamping unit of claim 1, wherein the piston rod of the piston cylinder system: is stationary and the cylinder of the piston cylinder system is placed in driving relation with the cross clamp.

4. The toggle lever clamping unit of claim 1, further comprising an accumulator and/for a hydraulic pump, connected to a pressure medium source for supply of the pressure fluid to act upon the piston cylinder system.

5. The toggle lever clamping unit of claim 1, wherein the piston cylinder system includes a piston, reciprocating in the cylinder and connected to the piston rod, for dividing the cylinder into pressure medium chambers, with the pressure fluid capable of circulating between the pressure medium chambers, when the hydraulic drive is in an idle state.

6. The toggle lever clamping unit of claim 1, wherein the electric drive includes an electric motor, a toothed rack operatively connected with the cross clamp, and a toothed wheel drivable by the electric motor and engaging the toothed rack.

7. The toggle lever clamping unit of claim 6, wherein the toothed wheel is embodied by an output pinion of a gear.

8. The toggle lever clamping unit of claim 1, wherein the electric drive includes an electric motor and a nut-spindle combination, with the nut being drivable by the electric motor and the spindle being operatively connected to the cross clamp, or with the spindle being drivable by the electric motor and the nut being operatively connected to the cross clamp.

9. The toggle lever clamping unit of claim 8, wherein the nut-spindle combination is embodied as a ball screw drive or as a roller screw drive.

10. The toggle lever clamping unit of claim 1, constructed in the form of a 5-point toggle lever clamping unit.

11. The toggle lever clamping unit of claim 1, further comprising two lever assemblies arranged opposite one another between the support plate and the movable platen in symmetry to the machine longitudinal axis, each of the two lever assemblies including:
    a pair of main levers, with one of the main levers articulatedly connected to the support plate at a first articulation point and another one of the main levers articulatedly connected to the movable platen at a second articulation point, wherein the pair of main levers are articulatedly connected to one another at a third articulation point, and
    a connecting lever having one end articulatedly connected to one of the main levers at a fourth articulation point in spaced-apart relation to the third articulation point, and another end articulatedly connected to the cross clamp at a fifth articulation point.

12. The toggle lever clamping unit of claim 1, wherein the electric drive and the hydraulic drive engage eccentrically on the cross clamp, with their axes extending symmetrically to one another around the machine longitudinal axis.

13. The toggle lever clamping unit of claim 1, wherein the electric drive engages centrically on the cross clamp, and further comprising a further said hydraulic drive, with the hydraulic drives engaging eccentrically on the cross clamp and defining axes extending symmetrically to one another around the machine longitudinal axis.

14. The toggle lever clamping unit of claim 1, wherein the hydraulic drive engages centrically on the cross clamp, and further comprising a further said electric drive, with the electric drives engaging eccentrically on the cross clamp and defining axes extending symmetrically to one another around the machine longitudinal axis.

15. The toggle lever clamping unit of claim 1, wherein the hydraulic drive and the electric drive are actively and inactively switchable independently of one another, such that the cross clamp is capable of being driven exclusively hydraulically or exclusively electrically or a combination thereof.

* * * * *